United States Patent
Jadhav et al.

(10) Patent No.: US 6,752,943 B1
(45) Date of Patent: Jun. 22, 2004

(54) APPARATUS AND PROCESS FOR GRANULATING DRY POWDER MATERIALS

(75) Inventors: Prakash Mahadeo Jadhav, Mumbai (IN); Jai Shroff, Mumbai (IN)

(73) Assignee: United Phosphorus, Ltd., Mumbai (IN)

( * ) Notice: Subject to any disclaimer, the term of this patent is extended or adjusted under 35 U.S.C. 154(b) by 0 days.

(21) Appl. No.: 10/373,194

(22) Filed: Feb. 26, 2003

Related U.S. Application Data

(60) Provisional application No. 60/437,006, filed on Dec. 31, 2002.

(51) Int. Cl.⁷ ............................ B29B 9/06; B29B 11/10; B29C 47/00
(52) U.S. Cl. ...................... 264/115; 264/117; 264/118; 264/123; 264/141; 264/143; 264/148; 264/211.21
(58) Field of Search ............................... 264/115, 117, 264/118, 123, 141, 143, 148, 211.21

(56) References Cited

U.S. PATENT DOCUMENTS

| | | |
|---|---|---|
| 3,716,600 A | 2/1973 | Magee |
| 3,845,172 A | 10/1974 | Magee |
| 3,914,417 A | 10/1975 | Magee |
| 4,218,444 A | 8/1980 | Koundakjian |
| 4,544,553 A | 10/1985 | Smolanoff |
| 5,075,058 A | 12/1991 | Chan |
| 5,100,667 A | 3/1992 | Chan |
| 5,298,501 A | 3/1994 | Cummings |
| 5,352,674 A | 10/1994 | Cummings |
| 5,369,100 A | 11/1994 | Cummings |
| 5,443,764 A | 8/1995 | Lloyd |
| 5,464,623 A | 11/1995 | Chan |
| 5,488,043 A | 1/1996 | Yamada et al. |
| 5,622,658 A | 4/1997 | Lloyd |
| 5,650,163 A | 7/1997 | Cannelongo |
| 5,698,540 A | 12/1997 | Katayama |
| 6,013,272 A | 1/2000 | Cummings |
| 6,337,323 B2 | 1/2002 | Cummings |
| 6,387,388 B1 | 5/2002 | Misselbrook |
| 6,582,638 B1 * | 6/2003 | Key ........................... 264/118 |
| 2001/0018063 A1 | 8/2001 | Cummings |
| 2002/0091106 A1 | 7/2002 | Cummings |
| 2002/0114821 A1 | 8/2002 | Lescota |

FOREIGN PATENT DOCUMENTS

| | | |
|---|---|---|
| EP | 0304492 | 12/1994 |
| JP | 58067603 | 4/1983 |
| JP | 6-92803 | 4/1994 |
| JP | 9-124406 | 5/1997 |
| WO | WO 98/26656 | 6/1998 |

OTHER PUBLICATIONS

International Specialty Products, "Granules & Tablets", Agrimer Polymers & Copolymers, International Specialty Products.

Fuji Paudal Co., Ltd., "Powder & Granulation Process Technology", Fuji Paudal Co., Ltd.

* cited by examiner

*Primary Examiner*—Stephen J. Lechert, Jr.
(74) *Attorney, Agent, or Firm*—Jones, Tullar & Cooper, P.C.

(57) ABSTRACT

Uniformly sized granules are formed using the present extruder and granulation process. The extruder contains a spiral worm screw for guiding a granulation material to an apertured plate. The spiral worm screw is rotated within a chamber and is formed from a guiding slant which terminates at a blunt edge near the apertured plate. The blunt edge rubs the granulation material against the apertured plate which softens the material foming a semi-solid material. The semi-solid material is then gently pushed through the apertured plate using just the required pressure. The granules are formed when the semi-solid material hardens after exiting the apertured plate.

29 Claims, 8 Drawing Sheets

APPARATUS AND PROCESS FOR GRANULATING DRY POWDER MATERIALS

CROSS-REFERENCE TO RELATED APPLICATION

This application claims the benefit, under 35 U.S.C. 119(e), of U.S. Provisional Application No. 60/437,006 filed Dec. 31, 2002, the contents of which are incorporated herein by reference.

BACKGROUND OF THE INVENTION

1. Field of the Invention

The present invention relates to an apparatus and process for extruding granules. Preferably, the granules are formed from dry powder material.

2. Description of Related Art

The extruders which are currently used employ rotating single or double screws to transport a moistened and kneaded material to be granulated to a die having holes. The pressure of the feeding screw and the scraping action of the screw(s) forces the material to come out of the holes of the die in the form of cylindrical strands.

One of the earliest extruders was an axial extruder which has either a single screw or a double screw. A schematic representation of such an extruder is shown in FIG. 1 of the drawings accompanying this specification. Generally, this extruder uses a rotating screw driven by a motor to convey the material to be extruded to a die having holes. The die is aligned axially with the screw. The material to be extruded is fed through the die and forced to transfer forwardly to the front end of the extruder by means of the conveying screw. The inaterial is pressurized and compressed to extrude out of the holes of the die. Hence, in these types of extruders, the compaction of the material is very high.

An improved version of the above-described extruder was fabricated to overcome the problem of high pressure and low production capacity of small sized granules found in the earlier types of extruders. This improved version is known as a screw-type radial extruder as depicted in FIG. 2. Generally, the raw material which is to be extruded is conveyed and cornpressed by a conveying screw axially within the screw housing. The material is then forced radially outward through a semi cylindrical die by means of an extracting screw. In this case, the extruding pressure changes its direction from axial flow to radial flow. Hence, the impact on the material employing this type of extruder is lower than the previously described extruder. However, the internal pressure generated by the conveying screw cannot be fully employed for the extrusion of the material through the die because the material changes its direction from axial to radial. This again leads to lower production capacity resulting in making the device uneconomical.

Alternatively, a low pressure basket type extruder positioned vertically/horizontally may be employed. This low pressure basket type extruder is depicted in FIG. 3. Generally, the low pressure basket type extruder consists of a basket shape housing holding a spherical plate with multiple holes. In this type of extruder, when the material to be extruded is fed to ihe extruder the material encounters a distributing plate which distributes the material uniformly. The extrusion blades, which are mounted to the rotating axis of the extruder, push the material out of the holes of the die in the form of strands. In this type of extruder, no screw is provided. Hence, the extrusion pressure is minimized and eventually the granules are formed under low impact and pressure. The problem encountered in these types of extruders is that it can not extrude a powder that is not moistened with externally added water or other solvents.

BRIEF SUMMARY OF THE INVENTION

The present invention is an extruder and granulation process for producing uniformly sized granules. The extruder contains a chamber having a chamber inlet and an apertured plate located at a bottom of the chamber. A spiral worm screw is positioned within the chamber for guiding a granulation material to the apertured plate. In a preferred embodiment, the granulation material is a dry powder material that is substantially free from water and/or solvent having a low softening point. The spiral worm screw, which includes a guiding slant terminating at a blunt edge at a distance from said apertured plate, is rotated within the chamber. When the granulation material is inserted into the chamber through the chamber inlet, the spiral worm screw is rotated. Upon rotation of the spiral worm screw, the blunt edge rubs the granulation material against the apertured plate resulting in an increase in pressure between the, granulation material and the apertured plate. This increase in pressure softens the granulation material transforming it to a semi-solid material. The semi-solid material is then gently extruded through the apertured plate using just the required pressure. The granules are hardened after extrusion through the apertured plate. The extruder may be used in a continuous manner to produce the desired granules.

The extruder and granules that are formed are preferred over the prior devices and compounds for a variety of reasons. When the granulation material is a dry powdered material substantially free from water and/or solvent, the material exiting the apertured plate is in the form of granules without the additional cutting step that is required in the prior art. However, additional cutting may be performed if the user requires a smaller granule size. Since additional water and/or solvents are not required in this granulation process, the granules that are formed do not need to be dried. However, drying of the granules may optionally be performed depending on the moisture content that is required. The rubbing action produced when the blunt edge pushes the granulation material against the apertured plate affects the water dispersibiltity of the granules and is preferred over previous compaction and impact granulation devices. Although a wide range of granules may be formed using the present extruder, the preferred diameter for the granules is 1–2 mm.

The present extruder is useful for granulation materials in all forms, especially dry powder material, which avoids the problems encountered in the prior extruders. ln;a preferred embodiment, the granules that are produced are water soluble or water dispersible granules having excellent water solubility and/or water dispersing quality for essentially environmentally friendly uses. Most preferably, the present extruder may be used for preparing granules of dry powdered, water soluble, low melting compounds and compositions, such as Acephate, Lambdacyhalothrin, Chloropropham, Metalaxyl, Bifenthrin, Devrinol, Chlorpyrifos, Endosulfan, Glyphosate, IPA salt, Varnidothion, Trichloron and the like without the problems encountered in prior devices.

BRIEF DESCRIPTION OF THE SEVERAL VIEWS OF THE DRAWING(S)

The features and advantages of the present invention will become apparent, from the following detailed description of a preferred embodiment thereof, taken in conjunction with the accompanying drawings, in which.

DETAILED DESCRIPTION OF THE INVENTION

Figure 1:
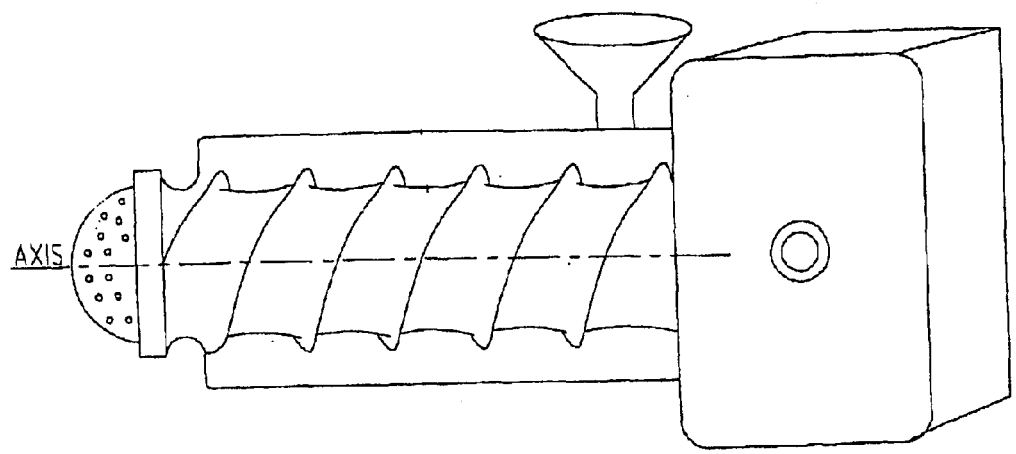
FIG. 1 is a general schematic view of a screw-type extruder known in the prior art.
Figure 2:
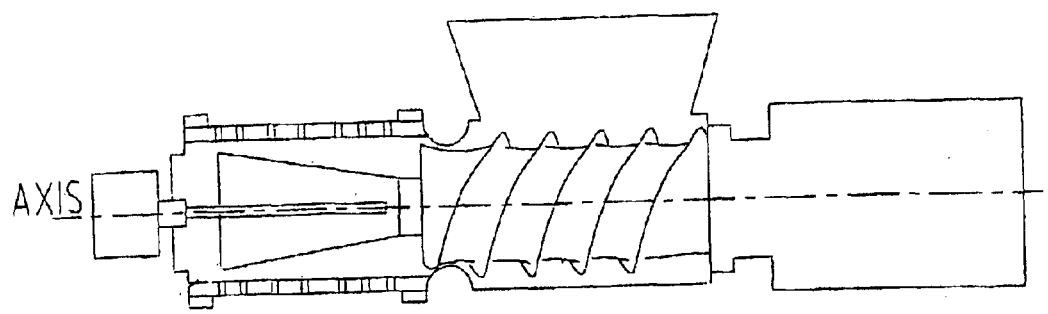
FIG. 2 is a general schematic view of a screw-type radial extruder known in the prior art.
Figure 3:
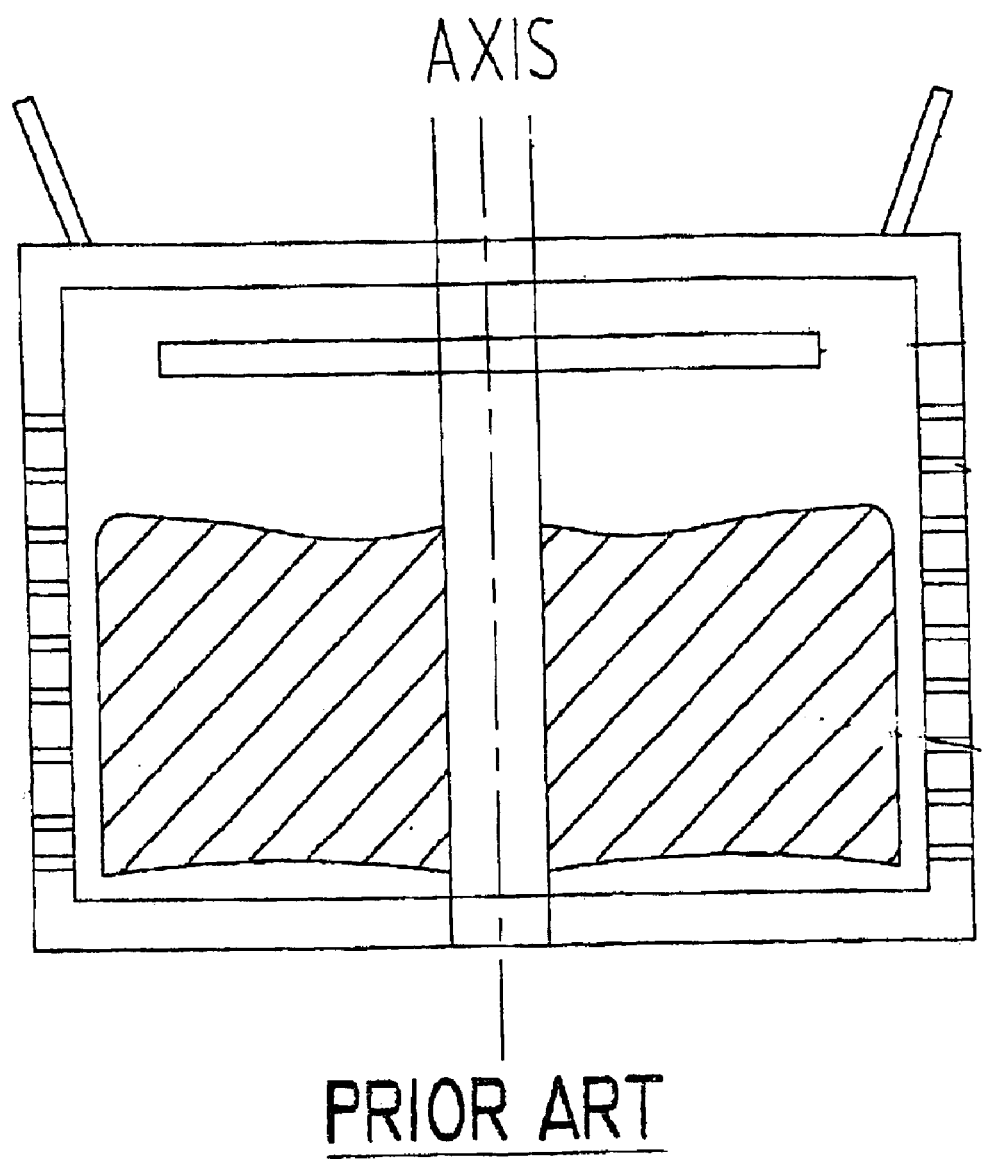
FIG. 3 is a general schematic view of a low pressure basket type extruder known in the FIG. 4 is a schematic view of the front elevation of the present extruder along with a stand and a motor.
Figure 4:
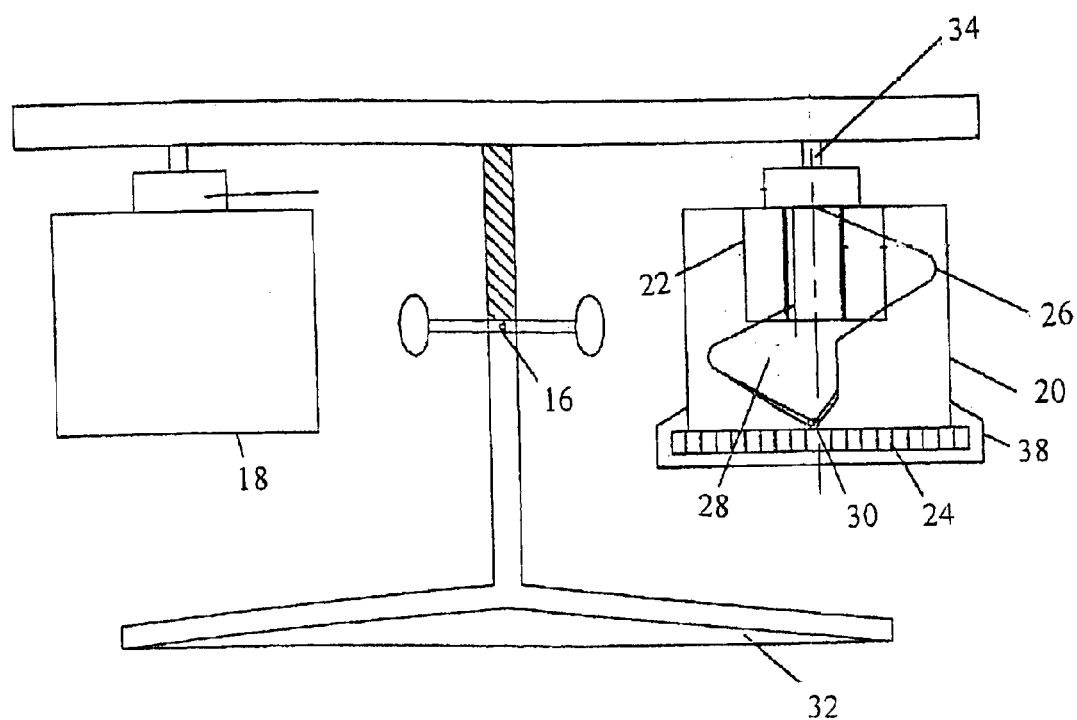

FIG. 4 shows a schematic view of the front elevation of the extruder 14 along with a preferred stand 16 and the motor 18. The extruder 14 comprises a chamber 20 provided with a chamber inlet 22 preferably at a suitable position near the top of the chamber 20 for charging the granulation material. The chamber 20 is preferably a jar-type chamber. The chamber inlet 22 is preferably a feed hopper. Although dry powder material substantially free from solvents and/or water is the preferred granulation material, the extruder 14 may also be used to form granules from moist starting material. The dry powder material preferably has a low softening point of 70° C. or less. Most preferably, the dry powder material has a low softening point in the range of 40–70° C. Also, the preferred dry powder material contains less than 1 wt. % moisture. The chamber 20 has a bottom provided with an apertured plate 24. The design of the apertured plate 24 is important in obtaining uniform granules and is discussed in further detail below. The apertured plate 24 is preferably attached to the chamber 20 using a holding frame 38. The holding frame 38 has appropriate hooks for clamping the apertured plate 24 to the chamber 20. The hooks are preferably positioned at 120° to each other. The chamber 20 also houses a rotatable spiral worm screw 26 having a guiding slant 28, the edge of which is a blunt edge 30. The spiral worm screw 26 is positioned inside the chamber 20 so that the blunt edge 30 is a distance from the apertured plate 24. The distance between the blunt edge 30 of the spiral worm screw 26 and the apertured plate 24 is preferably maintained in the range of 0.5 to 5.0 mm, most preferably between 1.0 to 2.5 mm. The chamber 20 and the spiral worm screw 26 may be preferably made of a thick metal block, such as Rhode of MS or SS or suitable alloy. In a preferred embodiment, an interior wall surface of the chamber 20 is wear resistant by preferably vacuum coating the chamber 20 with titanium.

The preferred embodiment of the extruder 14 depicted in FIG. 4 shows a stand 16 and a motor 18 attached to the extruder 14. However, one of ordinary skill in the art would readily ascertain additional means for holding the extruder 14 and this invention should not be limited to this particular stand 16 and motor 18 configuration. The stand 16 comprises a base 32 provided with a horizontal portion 34, the height of which is capable of adjustment. One side of the horizontal portion 34 has a motor 18 and the other side has the extruder 14. The motor 18 rotates the spiral worm screw 26.

As discussed above, the apertured plate 24 has a plurality of holes that are configured in such a manner to produce the desired high quality granules. The apertured plate 24 has holes which are uniquely spaced according to the diameter of the granules desired. In a preferred embodiment, the holes in the apertured plate 24 are arranged in an equilateral triangular relationship to one another. It is additionally preferred that the spacing or pitch between the centers of the holes is approximately twice the diameter of the holes. The apertured plate 24 is not a die as it is neither semi-solid nor drilled. Preferably, the thickness of the apertured plate 24 is significantly less than the thickness of a die. However, to get a smooth surface finish, the holes can be engineered to suit particular requirements. A blind space where there are no holes in the apertured plate 24 bears the pressure of extrusion and aids in increasing the density of the resulting granules. Unlike other prior extruders, there is minimal differential pressure that occurs while operating the present extruder. The thickness of the apertured plate 24 is adequately balanced to its diameter for just required plasticizing of the granulation material. When the holes are properly designed, the problems in the prior art associated with blocking or choking are overcome. Also, the apertured plate 24 thickness is balanced specifically in comparison to the diameter of the holes and distance between holes so that the friction produced by the rubbing of the granulation material against the apertured plate 24 is just enough to soften the granulation material. The softening of the granulation material results in the formation of smaller granules. The holes of the apertured plate 24 are preferably made by punching to ensure uniform diameter.

The granules are formed by inserting a granulation material into the extruder 14. The granulation material enter the chamber 20 of the extruder 14 through the chamber inlet 22. When the spiral worm screw 26 rotates, the granulation material present in the chamber 20 is guided to the bottom of the chamber 20 via the guiding slant 28. The blunt edge 30 of the spiral worm screw 26 rubs the granulation material against the apertured plate 24 increasing the pressure between the granulation material and the apertured plate 24. This increase in pressure elevates the temperature of the granulation material near the apertured plate 24 and softens the granulation material transforming it to a semi-solid material. The blunt edge 30 of the spiral worm screw 26, which is in contact with the semi-solid material, exerts just the required pressure by rubbing action to push the semi-solid material though the apertured plate 24. In a preferred embodiment, the force of gravity also aids in extruding the semi-solid material through the apertured plate 24 and the semi-solid material exits the apertured plate 24 under its own dead weight. The material exiting the apertured plate 24 is hardened to form the desired granules. When the granulation material is a dry powder material substantially free from water and/or solvents, the semi-solid material hardens upon extrusion through the apertured plate 24 in the form of granules, and not strands, due to the decrease in pressure and temperature. Granules formed in this manner do not stick and clump together. When moist material is extruded, the semi-solid material extruded through the apertured plate 24 may require additional processing steps, such as drying, in order to produce solid granules. There is minimal contact of the semi-solid material with the spiral worm screw 26 and the apertured plate 24 prior to granulation.

The extruder 14 and granules that are formed have several advantageous properties. In the preferred embodiment, when the granulation material is a dry powder material, the material extruded from the extruder 14 is in the form of granules without an additional cutting step. However, surface conditioning and/or cutting may be performed if the user requires a smaller granule size. Since additional water and/or solvents are not included in this preferred granulation process, the granules that are formed do not need to be dried. However, drying of the granules may optionally be performed depending on the moisture content that is required. Additionally, if the granulation material is not a dry powdered material, the material exiting the apertured plate 24 may need additional conditioning, such as drying, to obtain the desired granules. Although a wide range of granules may be formed using this extruder 14, the preferred diameter for the granules is 1–2 mm.

The output of the granules directly depends upon the percent openings (%) of the apertured plate 24. Percent openings can be anywhere between 12–40% and more preferably 25–30%. However, this can be altered depending on the size of the granules desired, the output desired, and the pressure which the apertured plate 24 can withstand. The relationship between extruding force and drag force could alter the percent openings of the apertured plate 24. The percent openings is directly proportional to the extruding force and inversely proportional to the drag force.

In operation, the present extruder 14 is utilized for the continuous processing of granulation material to produce agglomerated granules of a desired spherical diameter. The enhanced uniformity of granules produced by the present extruder 14 makes it useful for granulating compositions where it is particularly important that there is minimal range of variation in granule size, shape, density and compositions.

Figure 5:
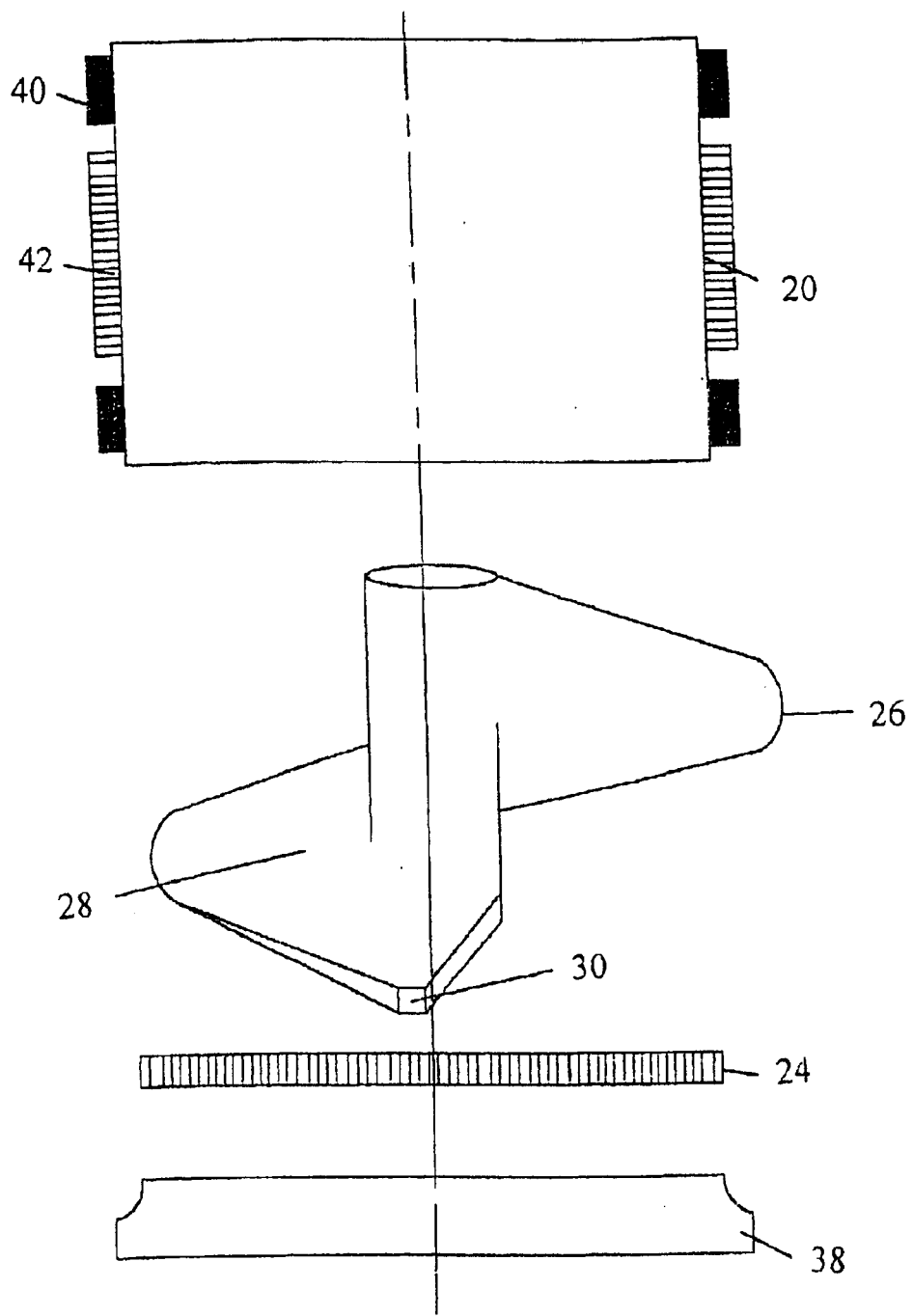
FIG. 5 is an enlarged schematic view of the chamber of the present extruder.
Figure 6:
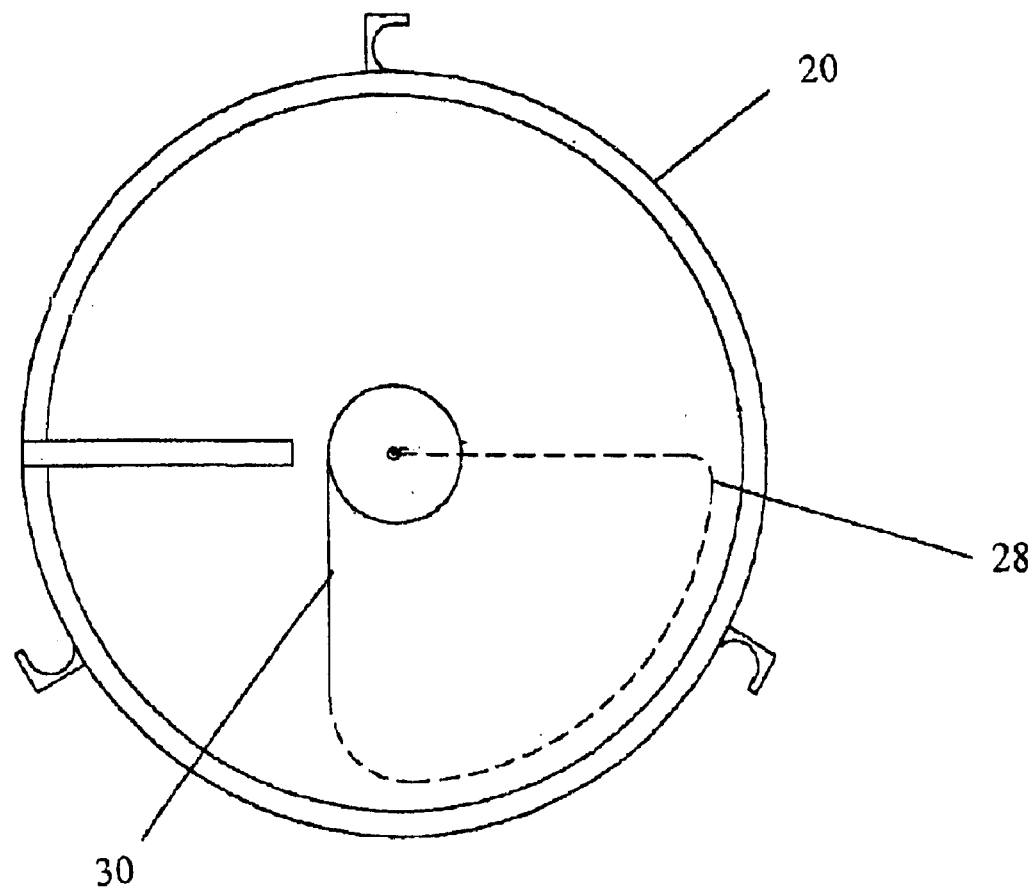
FIG. 6 is a schematic view of the cross section of the spiral worm screw taken through the chamber.
Figure 7:
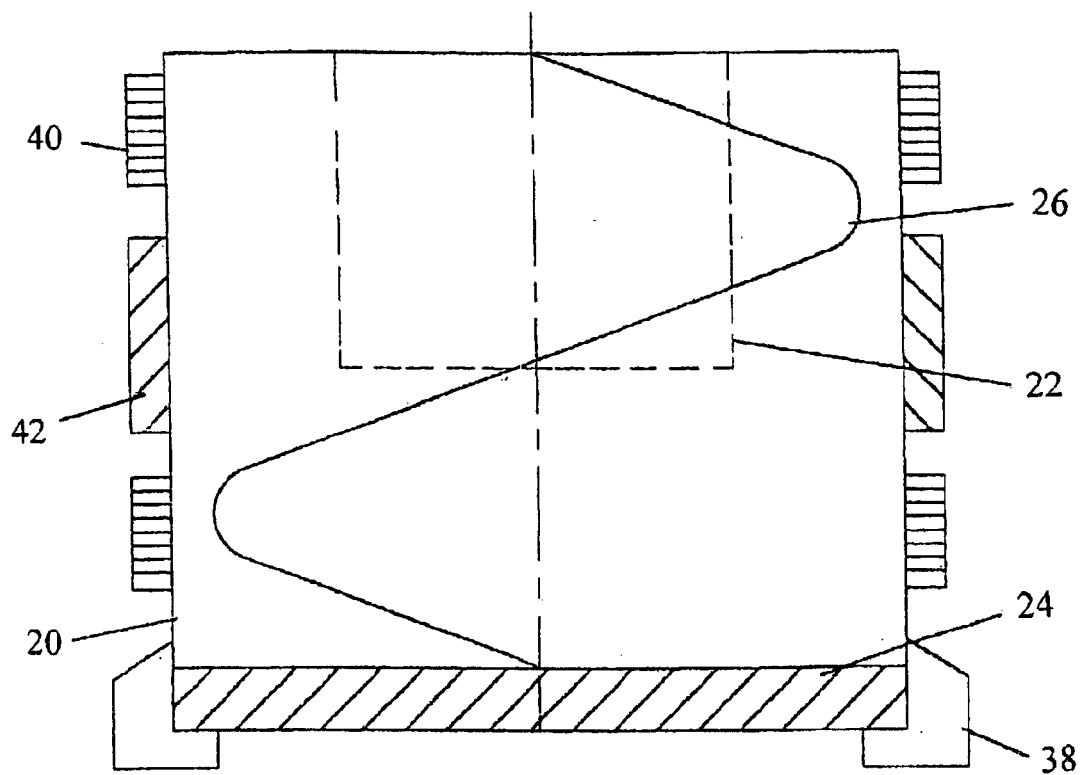
FIG. 7 is a schematic front view of the present extruder.
Figure 8:
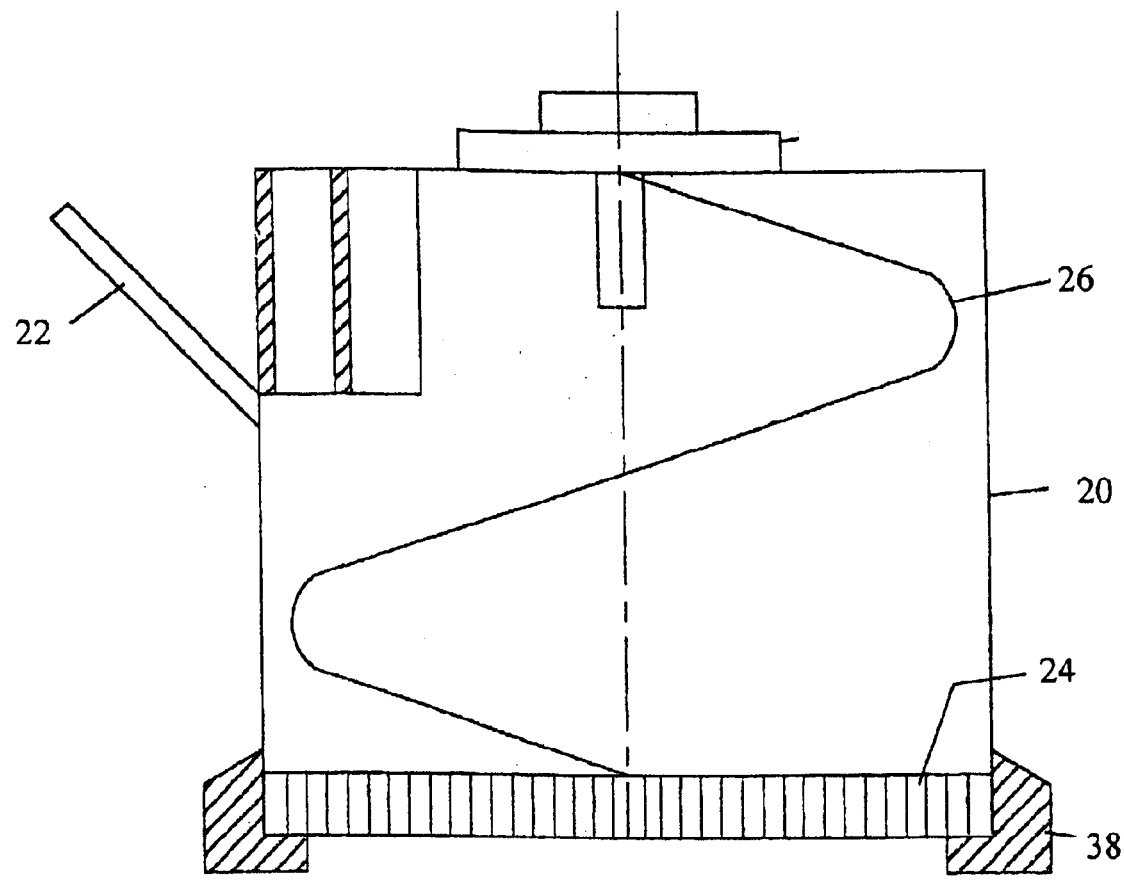
FIG. 8 is a schematic side view of the present extruder.

FIGS. 5–8 show additional schematic views of the extruder. FIG. 5 is an enlarged schematic view of the chamber 20 of the extruder 14. FIG. 5 shows the addition of a heating element 40 and a cooling element 42 on an outside wall of the chamber 20. FIG. 6 is a schematic cross-sectional view of the spiral worm screw 26 taken through the chamber 20. FIG. 7 is a schematic front view of the extruder 14. FIG. 8 is a schematic side view of the extruder 14.

Figure 10:
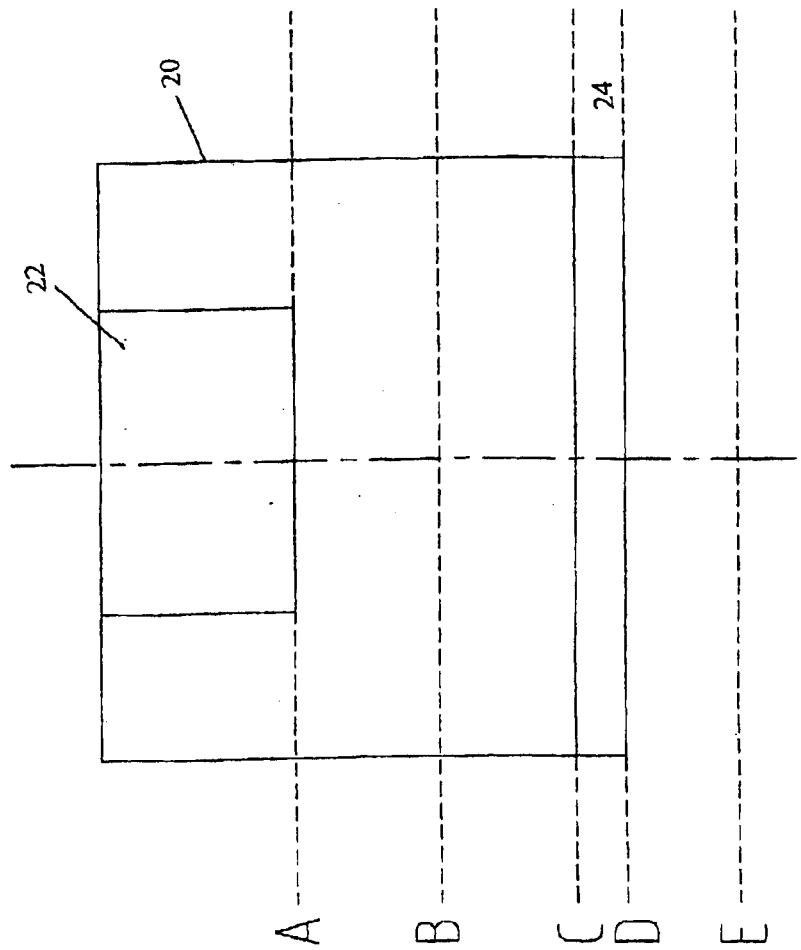
FIG. 10 is a sketch of the present extruder whereby various points in the extruder correspond with the pressure measurements indicated in FIG. 9.
Figure 9:
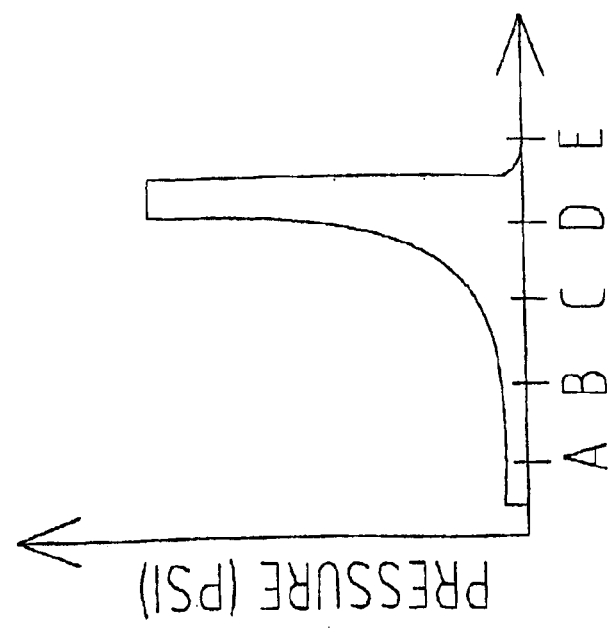
FIG. 9 is a graph showing the effect of pressure exerted to the chamber of the present extruder.

FIG. 9 is a graph showing the effect of pressure exerted at various points within the chamber 20 of the extruder 14. FIG. 10 is a sketch of the extruder 14 indicating the points within the chamber 20 corresponding to the pressure measurements indicated in FIG. 9. As shown in FIG. 9, the pressure near the top of the chamber 20 is small and increases near the bottom of the chamber 20 as the material begins to enter the apertured plate 24. This increase in pressure causes the granulation material to soften into the semi-solid material. As soon as the semi-solid material passes through the apertured plate 24, the pressure drops to zero and the granules are formed.

The present extruder 14 is useful for granulation materials in all forms, especially dry powder material. In a preferred embodiment, the granules that are produced are water soluble or water dispersible granules having excellent water solubility and/or water dispersing quality for essentially environmentally friendly uses. Preferably, granules containing insecticides are produced using the present extruder 14 and granulation method. Most preferably, the present extruder 14 may be used for preparing granules of dry, powdered, water soluble, low melting compounds and compositions, such as Acephate, Lambdacyhalothrin, Chloropropham, Metalaxyl, Bifenthrin, Devrinol, Chlorpyrifos, Endosulfan, Glyphosate, IPA salt, Vamidothion, Trichloron and the like.

According to another preferred embodiment of the present invention, granules of phosphoroamidothioate are prepared using the present extruder 14. The granules are preferably formed using the process disclosed in the co-pending U.S. application 10/126,965 filed on Apr. 22, 2002, which is hereby incorporated by reference. The co-pending application generally describes a process for preparing a chemically stable, dry flow, low compact dust free soluble granule of phosphoroamidothioates. Acephate is one of the important commercial insecticides within this class of compounds, which is a systemic insecticide of moderate persistence with residual activity lasting about 10–15 days. Granules containing 40–98 wt. % acephate, and preferably 95–98 wt. % acephate, are preferably formed using the present extruder 14 and granulation process. The granules of phosphoroamidothioate are generally prepared by the following process:

(1) preparing a dry premix by mixing 95–99% of the phosphoroamidothioate, preferably acephate, 0.5–5. % dispersing agent, 0.1–3.0% wetting agent, 0.1–0.3% binding agent, 0.03–0.08% antifoaming agent, 0.5–10.0% disintegrating agent, 0.05–1.0% stabilizer and fillers, all ingredients are in the form of solids without the addition of water or solvent to make 100% (w/w) in a premixer, (2) grinding the resulting mixture in a microniser to obtain 5 microns to 10 microns particle size, (3) mixing the ground mixture in a post mixer and then charging the mixture through a rotary feeder into the extruder 14 through chamber inlet 22 of chamber 20 shown in FIG. 4, (4) rotating the chamber 20 and the spiral worm screw 26 in such a way to convert the dry mix into a semi-solid material wherein the blunt edge 30 of the spiral worm screw 26, which is in contact with the semi-solid material, guides the semi-solid material through the apertured plate 24 by a rubbing action, exerting just the required amount of pressure, thereby forming the low compact granules, (5) collecting the resulting granules to obtain dry, semi-solid, low compact, dust free, soluble granules of the phosphoroamidothioate, (6) passing the granules through a hot air chamber for surface conditioning, (7) passing the resultant dry granules through an oscillating cutter and thereafter sieving to obtain granules, and (8) collecting the resulting granules to obtain dry, semi-solid, low compact, dust free, soluble granules of phosphoroamidothioate.

The granules of phosphoroamidothioate are essentially chemically stable, dry flow, low compact, dust free, soluble granules of phosphoroamidothioate having a length of 1.5–3.0 mm, and a diameter of 0.5 to 1.50 mm. These granules of phosphoroarnidothioatc are characterized by an aging stability of a minimum of two years.

Although the present invention has been disclosed in terms of a preferred embodiment, it will be understood that numerous additional modifications and variations could be made thereto without departing from the scope of the invention as defined by the following claims:

We claim:

1. A method for forming granules comprising, a) providing an extruder, said extruder including a chamber, said chamber having a bottom and a chamber inlet, b) locating an apertured plate in said bottom of said chamber, c) postioning a spiral worm screw within said chamber, said spiral worm screw including a guiding slant, said guiding slant terminating at a blunt edge, d) locating said blunt edge at a distance from said apertured plate, e) providing a granulation material, f) inserting said granulation material into said chamber through said chamber inlet, g) rotating said spiral worm screw and rubbing said granulation material against said apertured plate for increasing a pressure between said granulation material and said apertured plate, h) using said pressure for transforming said granulation material into a semi-solid material, i) extruding said semi-solid material through said apertured plate, and j) hardening said semi-solid material into granules.

2. The method of claim 1, further including providing said granulation material substantially free from water or solvents.

3. The method of claim 2, further including providing said granulation material containing less than 1 wt. % moisture.

4. The method of claim 3, further including providing said granulation material containing an insecticide.

5. The method of claim 4, further including providing said granulation material containing acephate.

6. The method of claim 5, further including providing said granulation material containing 95–98 wt. % acephate.

7. The method of claim 1, further including providing said granulation material having a softening point of 70° C. or less.

8. The method of claim 7, further including providing said granulation material having a softening point of 40–70° C.

9. The method of claim 1, further including providing said granulation material containing an insecticide.

10. The method of claim 1, further including providing said granulation material containing a compound selected from the group consisting of phosphoroamidothioate, lambdacyhalothrin, chloropropham, metalaxyl, bifenthrin, devrinol, chlorpyrifos, endosulfan glyphosate, IPA salt, vamidothion and trichlorfon.

11. The method of claim 10, further including providing said granulation material containing acephate.

12. The method of claim 11, further including providing said granulation material containing 40–98 wt. % acephate.

13. The method of claim 12, further including providing said granulation material containing 95–98 wt. % acephate.

14. The method of claim 1, further including providing a motor, said motor rotating said spiral worm screw.

15. The method of claim 1, further including providing a wear resistant material to an interior wall of said chamber.

16. The method of claim 15, further including providing a vacuum coating of titanium to an interior wall of said chamber.

17. The method of claim 1, further including providing a chamber comprising a jar-type chamber.

18. The method of claim 1, further including providing a holding frame, said holding frame securing said apertured plate to said chamber.

19. The method of claim 1, further including locating said blunt edge a distance of 0.5 to 5.0 mm from said apertured plate.

20. The method of claim 19, further including locating said blunt edge a distance of 1.0 to 2.5 mm from said apertured plate.

21. The method of claim 1, further including providing said apertured plate comprising a plurality of holes arranged in an equilateral triangle relationship to one another.

22. The method of claim 1, further including providing said apertured plate comprising holes having a spacing between the center of the holes that is twice the diameter of the holes.

23. The method of claim 1, further including providing said apertured plate having a percent openings between 12–40 percent.

24. The method of claim 23, ftrther including providing said apertured plate having a percent openings between 25–30 percent.

25. The method of claim 1, further including hardening said semi-solid materials into granules having a diameter of 1 to 2 mm.

26. The method of claim 1, further including surface conditioning said granules.

27. The method of claim 1, further including drying said granules.

28. The method of claim 27, further including cutting said granules.

29. The method of claim 1, further including cutting said granules.

* * * * *